(12) United States Patent
Raudsepp et al.

(10) Patent No.: US 11,801,569 B2
(45) Date of Patent: Oct. 31, 2023

(54) STOPPING AN ELECTROSLAG WELDING PROCESS

(71) Applicant: ESAB AB, Gothenburg (SE)

(72) Inventors: Hannes Hugo Raudsepp, Täby (SE); Ulf Nicklas Andrén, Röfors (SE)

(73) Assignee: ESAB AB, Gothenburg (SE)

( * ) Notice: Subject to any disclaimer, the term of this patent is extended or adjusted under 35 U.S.C. 154(b) by 940 days.

(21) Appl. No.: 15/635,767

(22) Filed: Jun. 28, 2017

(65) Prior Publication Data
US 2019/0001432 A1    Jan. 3, 2019

(51) Int. Cl.
*B23K 25/00* (2006.01)
*B23K 9/12* (2006.01)

(52) U.S. Cl.
CPC .......... *B23K 25/005* (2013.01); *B23K 9/125* (2013.01); *B23K 25/00* (2013.01)

(58) Field of Classification Search
CPC ....... B23K 9/124; B23K 25/005; B23K 25/00
USPC ....................................................... 219/73.11
See application file for complete search history.

(56) References Cited

U.S. PATENT DOCUMENTS

| | | | | |
|---|---|---|---|---|
| 3,223,818 A | * | 12/1965 | Chyle ................... | B23K 9/188 219/73 |
| 3,466,421 A | * | 9/1969 | Gershovich ........... | B23K 25/00 219/126 |
| 3,507,968 A | * | 4/1970 | Parsons ................. | F27D 3/18 373/47 |
| 3,510,626 A | * | 5/1970 | Mitsuo .................. | B23K 9/02 219/125.11 |
| 3,625,757 A | * | 12/1971 | Wiehe ................... | B23K 25/00 428/386 |
| 3,715,559 A | * | 2/1973 | Norcross ............... | B23K 9/038 219/126 |
| 3,777,106 A | * | 12/1973 | Nuccel .................. | B23K 25/005 219/73.11 |
| 3,788,384 A | * | 1/1974 | Ujiie ..................... | B22D 23/10 164/515 |
| 3,795,781 A | * | 3/1974 | Coulter ................. | B23K 25/00 219/73.1 |

(Continued)

FOREIGN PATENT DOCUMENTS

CN     201136083 A    10/2008
CN     101842183 A     9/2010
(Continued)

OTHER PUBLICATIONS

ESAB Welding and Cutting Produts A6S SAW Strip Cladding Head for Surfacing with High Alloyed Materials, US Fact Sheet, Jul. 2013, 1 page.

(Continued)

*Primary Examiner* — Eric S Stapleton
(74) *Attorney, Agent, or Firm* — Edell, Shapiro & Finnan, LLC

(57) ABSTRACT

Stopping electroslag strip cladding operations feeding multiple strips includes detecting, during a welding phase of an electroslag welding operation feeding a first strip and a second strip towards a molten slag pool formed on a work piece, initiation of a stop phase. Upon detection the feeding of the first strip towards the molten slag pool is stopped. Additionally, a feed direction of the feeding of the second strip is reversed to retract the second strip away from the molten slag pool.

6 Claims, 7 Drawing Sheets

(56) References Cited

U.S. PATENT DOCUMENTS

| | | | | |
|---|---|---|---|---|
| 3,885,922 A | * | 5/1975 | Thomas, Jr. | B23K 9/038 428/683 |
| 4,151,389 A | * | 4/1979 | Hirsch | B23K 25/00 219/137.71 |
| 4,618,760 A | * | 10/1986 | Murch | B23K 9/0678 219/130.4 |
| 4,780,594 A | * | 10/1988 | Rothermel | B23K 9/124 219/137.71 |
| 5,155,330 A | * | 10/1992 | Fratiello | B23K 9/1735 219/137 R |
| 6,060,678 A | * | 5/2000 | Allford | B23K 9/048 219/60 R |
| 6,297,472 B1 | * | 10/2001 | Bong | B23K 9/0203 219/125.12 |
| 9,289,843 B2 | * | 3/2016 | Golding | B23K 9/04 |
| 9,555,493 B2 | * | 1/2017 | Peters | A61B 10/0045 |
| 10,596,665 B2 | * | 3/2020 | Brambilla | B23K 9/042 |
| 2001/0030175 A1 | * | 10/2001 | Bong | B23K 9/122 219/73.1 |
| 2002/0005397 A1 | * | 1/2002 | Bong | B23K 9/0203 219/125.1 |
| 2003/0052110 A1 | * | 3/2003 | Gandy | B23K 9/188 219/137.7 |
| 2004/0245230 A1 | * | 12/2004 | Huismann | B23K 9/073 219/137.7 |
| 2005/0189335 A1 | * | 9/2005 | Huismann | B23K 9/073 219/137.71 |
| 2006/0163225 A1 | * | 7/2006 | Takahashi | B23K 9/124 219/125.11 |
| 2006/0207983 A1 | * | 9/2006 | Myers | B23K 9/092 219/137 PS |
| 2006/0243704 A1 | * | 11/2006 | Matz | B23K 9/1735 219/74 |
| 2007/0151964 A1 | * | 7/2007 | Artelsmair | B23K 9/124 219/137.2 |
| 2008/0190900 A1 | * | 8/2008 | Zhang | B23K 9/0953 219/121.45 |
| 2010/0213181 A1 | * | 8/2010 | Hirota | B23K 9/0671 219/130.31 |
| 2011/0198329 A1 | * | 8/2011 | Davidson | B23K 9/124 219/130.5 |
| 2012/0118859 A1 | * | 5/2012 | Danks | B23K 25/00 219/73.1 |
| 2013/0004674 A1 | * | 1/2013 | Golding | B23K 9/04 427/457 |
| 2014/0209571 A1 | * | 7/2014 | Bruck | B23P 6/007 219/73.1 |
| 2014/0339203 A1 | * | 11/2014 | Peters | B23K 9/04 219/76.14 |
| 2015/0202709 A1 | * | 7/2015 | Raudsepp | B23K 9/121 219/73 |
| 2015/0231727 A1 | * | 8/2015 | Oh | B23K 9/1043 219/130.1 |
| 2016/0059341 A1 | * | 3/2016 | Peters | B23K 9/121 219/137.44 |
| 2016/0221105 A1 | * | 8/2016 | Henry | B23K 9/124 |
| 2016/0339533 A1 | * | 11/2016 | Oxlade | B23K 9/0953 |
| 2017/0021440 A1 | * | 1/2017 | Balaster | B23K 9/124 |
| 2017/0312843 A1 | * | 11/2017 | Brambilla | B23K 9/04 |
| 2017/0312844 A1 | * | 11/2017 | Brambilla | B23K 25/005 |
| 2017/0312864 A1 | * | 11/2017 | Brambilla | B23K 9/042 |
| 2017/0312865 A1 | * | 11/2017 | Brambilla | B23K 9/042 |
| 2017/0313536 A1 | * | 11/2017 | Brambilla | B23K 9/186 |
| 2018/0178317 A1 | * | 6/2018 | Nateghi | C22C 38/48 |

FOREIGN PATENT DOCUMENTS

| | | |
|---|---|---|
| CN | 103402686 A | 11/2013 |
| CN | 103648701 A | 3/2014 |
| CN | 106573327 A | 4/2017 |
| DE | 1615311 A1 | 5/1970 |
| JP | S58122193 A | 7/1983 |

OTHER PUBLICATIONS

GIGA Italian Welding Institute National Welding Days Experimental Characterization of Welding Electroslag Process (ESSC) With Multi Strip Technique Twin Type, available Jul. 1, 2014, 27 pages.

Thakare Niraj S. et al., Electro Slag Strip Cladding Process, International Journal of Modern Engineering Research (IJMER), ISSN: 2249-6645, vol. 4, Iss. 7, Jul. 2014, 5 pages.

Marian Sigmund, Twin Strip Electroslag Cladding, Wirpo s.r.o., Brno, Czech Republic, DOI: 10.17973/MMSJ.2016_11_2016136, MM Science Journal, Nov. 2016, 4 pages.

International Preliminary Report on Patentability and Written Opinion for International Application No. PCT/IB2018/054059 dated Dec. 31, 2019, 8 pages.

Office Action for Chinese Patent Application No. 201880042191.4 dated Mar. 18, 2021 with English translation, 20 pages.

Office Action for Chinese Patent Application No. 201880042191.4 dated Dec. 20, 2021 with English translation, 14 pages.

Office Action for Chinese Patent Application No. 201880042191.4 dated Jun. 22, 2022 with English translation, 12 pages.

Office Action for Chinese Patent Application No. 201880042191.4 dated Nov. 2, 2022 with English translation, 16 pages.

"Twin Strip Electroslag Cladding", Marian Sigmund et al., MM Science Journal, pp. 1420-1423, Nov. 2016, published on Nov. 30, 2016.

* cited by examiner

STOPPING AN ELECTROSLAG WELDING PROCESS

TECHNICAL FIELD

The present disclosure is directed toward electroslag welding and, in particular, toward stopping an electroslag welding process.

BACKGROUND

Electroslag strip cladding (ESSC) is a development of submerged arc strip cladding that is based on the ohmic resistance heating of an electrically conductive slag to create a pool of molten slag. During ESSC operations there is no arc between the strip electrode and the parent or base material (i.e., the work piece). Instead, heat generated by the pool of molten slag (which, in some instances, is referred to as a welding bath) melts the surface of a base material, an edge of a strip electrode submerged in the molten slag, and flux (which protects the molten slag pool and degasses a welding head being used for the ESSC process). In order to operate with the molten slag pool, which may be maintained at a temperature of approximately 2,300° C., a plating or cladding head (i.e., the head guiding one or more metal strips to the molten pool of slag) is usually a water-cooled, heavy duty head. The plating head also usually includes a motorizing driving roll for strip feeding.

The utilization of a molten slag pool, as opposed to an arc, makes ESSC a reliable high deposition rate process suitable for cladding operations (which apply welded deposits over a large surface area). By comparison, submerged arc cladding creates significantly more dilution than the 7-10% dilution typically produced with ESSC (i.e., 50% more dilution than ESSC for the same heat input). Moreover, ESSC provides a higher deposition rate (i.e., the rate at which weld metal is deposited onto the work piece surface) and creates less penetration as compared to submerged arc cladding. For at least these reasons, ESSC may be preferable to submerged arc cladding when surfacing or cladding flat and curved objects such as heat exchangers, tubes, tube sheets and various pressure vessels. That being said, ESSC is still quite expensive and, thus, any improvements to the efficiency, productivity, dilution, etc. of ESSC are desirable.

More specifically, ESSC costs are typically driven by the cost of the equipment, most notably the plating head and feeding system, and the material utilized for the cladding. In fact, cladding techniques primarily exist because forming a part, vessel, plate, etc. entirely from a cladding material is often considerably more expensive than forming the part from an inexpensive material and cladding the part with the cladding material. Consequently, any developments in equipment or feeding systems that increase efficiency, quality, productivity, or otherwise minimize the amount of time and material required for cladding are highly desirable.

For example, in order to increase productivity, some cladding heads now accommodate two strips and introduce both strips into the same molten slag pool (at different locations within the same molten slag pool). Introducing two strips into the molten slag pool may extend the length of the molten slag pool (i.e., the introduction of a second strip may extend a slag pool approximately 20-35 mm) so that the molten slag pool begins to solidify approximately 20-25 mm after the trailing strip (i.e., the second strip). This may encourage the formation of flat beads and proper links during ESSC. Moreover, a head that accommodates two strips may increase the deposition rate (thereby increasing productivity), decrease dilution, and allow for unique cladding compositions (i.e., by mixing different strips).

However, the introduction of a second strip may also create productivity issues associated with feeding two (or more) strips at once. For example, depending on the feed rate(s) of trailing strip(s), one or more trailing strip may be in contact with the molten slag pool when ESSC operations are stopped (i.e., paused or completed). This may negatively impact the weld integrity and/or create additional work. In particular, if a trailing strip is in contact with the molten slag pool as the molten slag pool solidifies, the trailing strip may be secured therein and will need to be removed with cutting and/or melting operations (which may, in turn, necessitate further welding or finishing operations).

SUMMARY

The present disclosure is directed toward stopping electroslag welding operations utilizing multiple strips, or more specifically stopping electroslag strip cladding with multiple strips. The invention can be embodied as a method, a system, an apparatus, and executable instructions in a computer-readable storage media to perform the method.

According to at least one example embodiment, stopping electroslag strip cladding operations feeding multiple strips includes detecting, during a welding phase of an electroslag welding operation feeding a first strip and a second strip towards a molten slag pool formed on a work piece, initiation of a stop phase. Upon detection the feeding of the first strip towards the molten slag pool is stopped. Additionally, a feed direction of the feeding of the second strip is reversed to retract the second strip away from the molten slag pool.

BRIEF DESCRIPTION OF THE SEVERAL VIEWS OF THE DRAWINGS

Like numerals identify like components throughout the figures.

DETAILED DESCRIPTION

The techniques presented herein control trailing strips during a stop or pause in cladding (ESSC) processes utilizing multiple strips. These techniques ensure that any trailing strips (i.e., a second strip, third strip, or any strip after the first or leading strip) are properly positioned when a cladding process terminates and, thus, improve the quality of the welds formed during an ESSC process. More specifically, the techniques presented herein, reverse the feed direction of any trailing strips when an ESSC operation is stopped in order to ensure that the trailing strips are removed from the molten slag pool utilized during ESSC operations. If, instead, the trailing strips are disposed within the molten slag pool at the end of ESSC operations, the trailing strips may become stuck in the slag pool as it solidifies. That is, the trailing strips may be secured or bonded to the solidified slag pool. This bond may prevent the welding apparatus from moving away from the workpiece and/or may damage the welding apparatus if it attempts to move. Moreover, the unwanted bond may destroy or damage a cladded workpiece and may require a user to cut, grind, and/or re-weld the workpiece/cladding to finish the ESSC process (i.e., to break the bond and finish or refinish the area).

Put another way, the techniques presented herein control the feed speed and feed direction of one or more trailing strips during a stop phase of ESSC operations. The feed direction is reversed to remove the trailing strips from the molten slag, however, the speed of the reversal may depend on a measured welding parameter. Regardless of how the feed speed of the one or more trailing strips is controlled (i.e., regardless of the input), the techniques presented herein remove any trailing strips from the molten slag pool to ensure that the trailing strips do not get stuck to a solidified slag pool.

Figure 1:
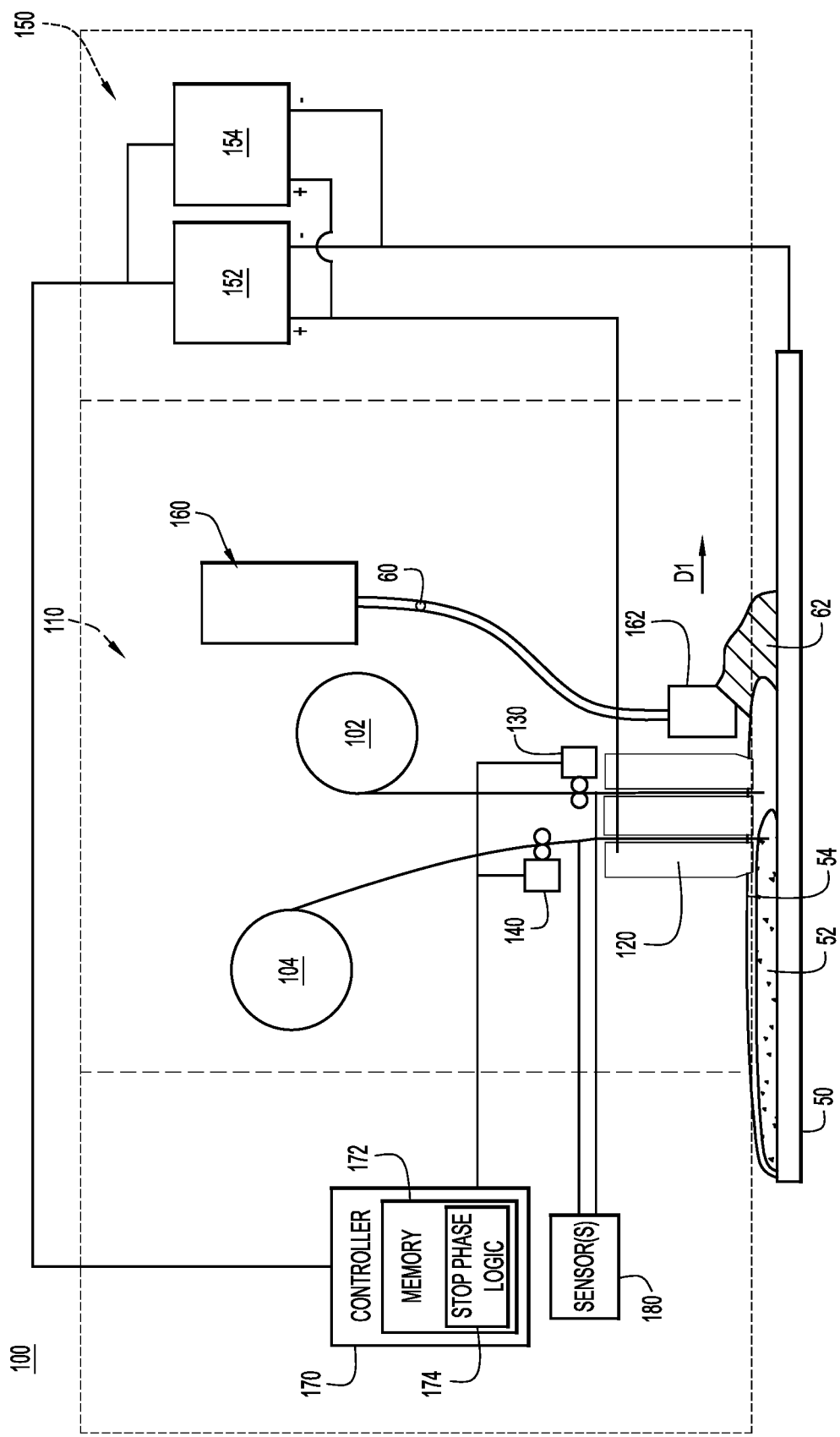
FIG. 1 is a diagram illustrating a cladding environment in which the techniques presented herein may be employed to clad a work piece, according to an example embodiment.

Now turning to FIG. 1, a description is provided of an example cladding environment 100 in which the techniques presented herein may be employed. In environment 100, various components of a cladding apparatus 110 are illustrated performing ESSC operations on a work piece 50. The apparatus 110 is a twin ESSC apparatus 110 (i.e., a twin ESSC plating or cladding head) and thus, is configured to guide or feed a first strip of cladding material 102 and a second strip of cladding material 104 towards the work piece 50. More specifically, in the depicted embodiment, the apparatus 110 includes a first strip feeder 130 that is configured to feed the first strip 102 to a contact jaw 120 and a second strip feeder 140 that is configured to feed the second strip 104 to the same contact jaw 120. The contact jaw 120 then guides strips 102 and 104 towards the work piece 50. However, in other embodiments, the strips need not be fed to the same contact jaw (or even be fed through the same cladding head) and, instead, may be fed to separate jaws (or heads). Along the same lines, in other embodiments, that apparatus may guide or feed more than two strips to the work piece 50. In fact, in some embodiments, any number of strips may be fed to any number of jaws/heads, with any combination of strips being fed to any of the jaws/heads (i.e., two strips for each of two heads that each include a single jaw).

In the depicted embodiment, strips 102 and 104 are arranged as "twin strips" because the strips are fed in parallel, as a double strip arrangement. However, the term parallel is not intended to imply that strips 102 and 104 are fed at the same rate by their respective feeders 130 and 140. Instead, strips 102 and 104 may be fed at different rates. In order to feed strips 102 and 104, feeders 130 and 140 may each include any parts or components that move strips 102 and 104 towards the work piece 50 (via the jaw 120). For example, feeders 130 and 140 may include grooved wheels driven by a driving unit, such as an electric motor. In embodiments utilizing grooved wheels, two grooved wheels may engage either side of each strip and rotate in opposite directions to move a strip towards the work piece 50. The grooved wheels may be coupled to driving motors via any desirable drive shaft, power train, gearing arrangement, or other such mechanical coupling that allows rotational energy to be imparted to the feeders.

Moreover, in the depicted embodiment, the first strip of material 102 and the second strip of material 104 are each provided as spools or coils of cladding material (i.e., spools of metal strips with a width of 90 mm and a thickness of 0.5 mm). Consequently, the first feeder 130 and second feeder 140 unwind or unspool the first strip 102 and the second strip 104 as the feeders 130 and 140 feed strips 102 and 104 to the work piece 50 via the contact jaw 120. Although not shown, in some embodiments feeders 130 and/or feeder 140 may include or be coupled to a straightener or straightening unit configured to straighten and/or align a strip as it is drawn from its coil/spool (i.e., as strip 102 or 104 approaches grooved wheels of feeder 130 or 140, respectively). However, in other embodiments, the strips can be fed from any desirable reservoir and feeders 130 and 140 need not unwind or unspool strips 102 and 104 while feeding the strips.

Once strips 102 and 104 are fed to the contact jaw 120, the contact jaw 120 aligns strips 102 and 104 in the welding direction D1 so that the apparatus guides strips 102 and 104 to the same portion of the work piece 50 as the welding operations move in the welding direction D1. That is, strips 102 and 104 are spaced a distance from each other in the welding direction D1, insofar as "welding direction" is the direction in which a weld is intended to run (i.e., the welding direction is the direction of movement of a cladding head). Consequently, the first strip 102 may be referred to as the leading strip 102 and the second strip 104 may be referred to as the trailing strip 104. However, in other embodiments, two or more strips can be arranged in various settings or formations. For instance, strips can be disposed along an axis that is perpendicular to the welding direction D1, spaced different distances from each other in the welding direction, or a combination thereof.

In the event two or more strips are spaced along an axis that is perpendicular to the welding direction D1 (i.e., spaced along a "transverse axis"), the strips may be positioned side by side, for example, to clad a wide span at once. By comparison, when the strips are aligned in the welding direction (like strips 102 and 104), the strips may perform different roles in a single cladding pass and/or form a cladding layer with a mixed composition (i.e., if the different strips are different materials). Still further, in some embodiment, a plurality of strips may be arranged in a grid-like arrangement so that at least some of the plurality of strips are spaced along a transverse axis and other strips are aligned in the welding direction D1 (i.e., to provide a specific welding composition over a wide span).

Still referring to FIG. 1, the apparatus 110 also includes a flux hopper 160 that is a repository for flux 60. The flux hopper is configured to selectively deliver flux 60 to a flux drop 162 disposed adjacent to the contact jaw 120. Fluxes are generally granular fusible minerals typically containing oxides of manganese, silicon, titanium, aluminum, calcium, zirconium, magnesium and other compounds such as calcium fluoride. The role of the flux 60 in ESSC is described in further detail below, but, generally, the flux 60 helps to produce a metal weld 52 with a specific chemical composition and specific mechanical properties under a layer of slag 54. That is, the flux 60 is specially formulated to be compatible with a given strip or strips of cladding material so that the combination of flux and the strip(s) produces desired mechanical properties. In the depicted embodiment, flux 60 is delivered (i.e., by a nozzle of the flux drop 162) on the leading edge of the contact jaw 120 to produce a protective layer 62 over a molten slag pool, as is described in further detail below. Additionally or alternatively, flux may be delivered to the trailing edge of the contact jaw 120 to provide a layer of flux over any molten slag included above the metal weld 52 (i.e., the assembly 110 may include a second or repositioned hopper 160 and/or drop 162).

The apparatus 110 also comprises a power source 150, a controller 170, and one or more sensors 180. These components are each shown in dashed boxes connected to the dashed box of apparatus 110 because these components may be included in apparatus 110 (i.e., included during manufacturing of apparatus 110) or connected thereto (i.e., retrofitted to the apparatus 110 and/or connected via a wired or wireless connection). For example, the operations of controller 170 may be executed by components included in the power source 150 (i.e., the controller 170 may be a user interface and the power source 150 may regulate feed speed of strips 102 and 104). Each of these components is addressed in turn below.

First, the power source 150 may be included in or connected to the apparatus 110 and may include any number or type of power sources, such as a welding converter, a welding transformer, a rectifier, a thyristor controlled rectifier or an inverter. As an example, power source 150 may include two parallel direct current (DC) power sources 152 and 154 that are each connected to the assembly 110. Regardless of how the power source 150 is provided, the power source 150 provides a current to the contact jaw 120 that flows into any strip(s) fed therethrough. The current is transferred to the entire surface area of the strip(s) in contact with the contact jaw 120 and, importantly, the current is applied individually to each strip of material passing through a cladding head. However, since the current is from a single source (even if the source comprises multiple components in parallel, like source 150), each strip may receive approximately the same magnitude of current. That is, strip 102 and 104 may receive approximately equal amounts of current individually (dependent on localized resistance levels in the molten slag) unless current is diverted away from one of the strips (an example situation where diverting might occur is discussed below in connection with FIG. 4). When current is introduced to both strips, the current from each strip passes into the layer of electrically conductive slag 54 and, as is described in further detail below in connection with FIG. 2, the resistance of the slag 54 generates heat as the slag 54 receives current to effectuate the cladding process (i.e., the temperature of the slag adjacent the strip(s) providing current may be approximately 2,300° C.).

Second, the controller 170 is connected to the apparatus 110 and configured to control the first feeder 130 and the second feeder 140 in the manner described below in connection with FIGS. 4-6. More specifically, the controller 170 includes a memory 172 with stop phase logic 174 stored therein. The stop phase logic 174 is configured to perform the operations discussed below in connection with FIGS. 4-6. In some embodiments, the controller 170 is local to the apparatus 110 (i.e., included in, embedded in, or connected to the power source 150); however, in other embodiments, the controller 170 may be remote from the apparatus 110 and may be connected thereto via a network connection (i.e., a network connection formed by a communication interface included in the controller 170, as is described in further detail below in connection with FIG. 7). An example computing device that is representative of controller 170 is described below in connection with FIG. 7.

Third, the apparatus 110 may include or be coupled to one or more sensors 180. The sensor(s) 180 are configured to measure or monitor various welding parameters, including voltage, current, and other electrical parameters, as is described below in further detail. For example, sensor(s) 180 may include one or more shunts in the power source to measure electrical parameters. The sensor(s) 180 may send any data to the controller 170 so that the controller 170 can determine a feed speed of one or more strips and/or any welding parameters. Information measured or collected by sensor(s) 180 is advantageously sent to the controller as soon as it is measured/collected, to prevent unnecessary delays in feed speed regulation/adjustment. Additionally, sensors 180 may measure the feed speed of any trailing strips, such as strip 104. The sensor(s) 180 may measure the feed speed by measuring the speed with which a strip passes through the contact jaw 120 (in either direction), the speed with which a spool of the strip winds or unwinds (i.e., a pulse sensor may count rotations of a strip coil), or any other parameter that is indicative of speed, such as motor parameters (i.e., motor parameters of motors in feeders 130 and 140), welding current, etc.

Figure 2:
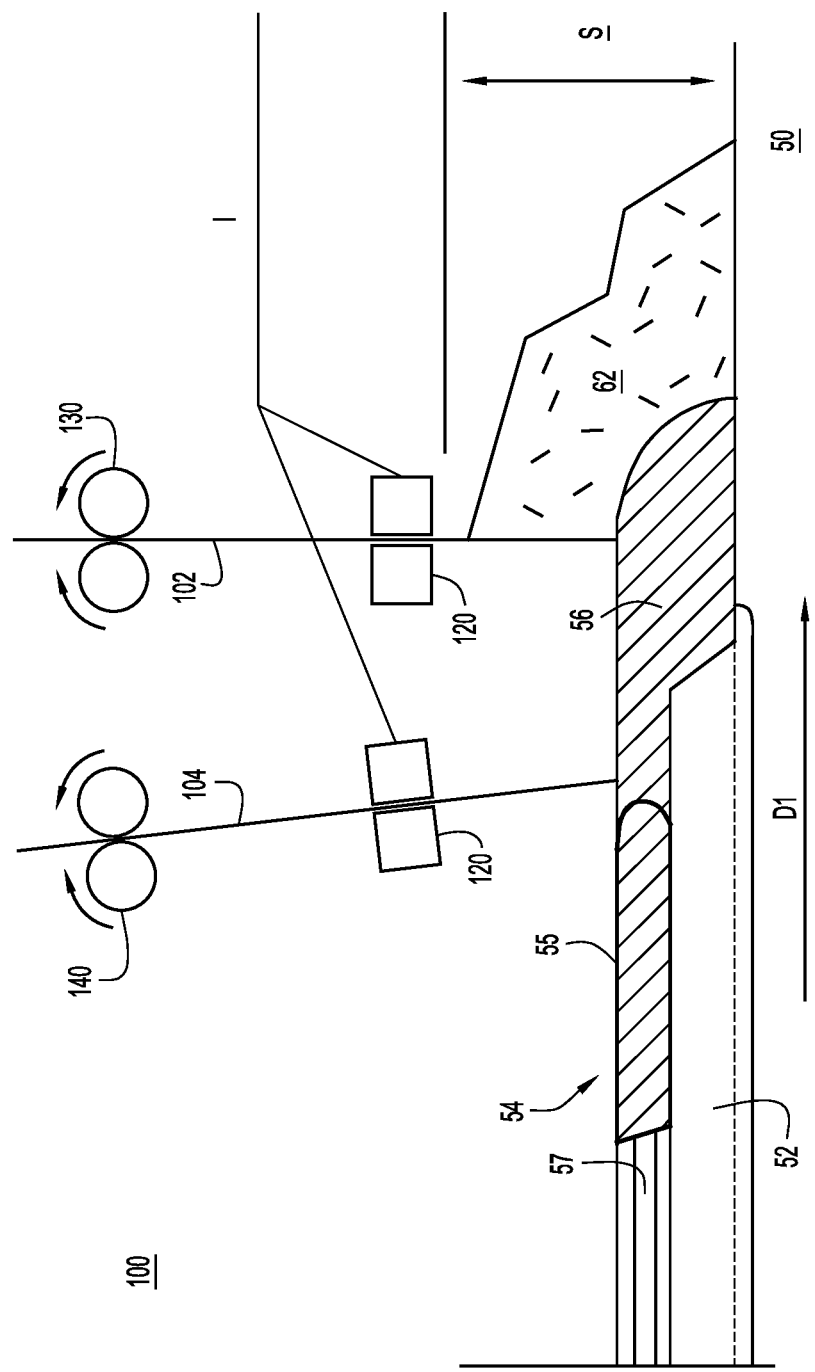
FIG. 2 is a diagram illustrating the work piece of FIG. 1 in further detail.

Now referring to FIG. 2, but with continued reference to FIG. 1, during a welding or cladding phase, the apparatus 110 is generally configured to clad a work piece 50 with at least one of the first strip 102 and the second strip 104 in accordance with ESSC principles. That is, the physical principles that control the ESSC processes effectuated by assembly 110 are substantially the same as the physical principles used for known ESSC methods, except, the techniques presented herein control the apparatus when a stop phase is initiated for the ESSC operations. That is, the techniques presented herein are intended for use during a stop phase, which may be a phase during which cladding operations are ended or terminated. For background, the start-up and welding/cladding phases are described below, but, generally, the welding phase may be the phase between a start-up phase (creation of the molten slag pool and stabilization of welding parameters) and a stop phase (termination of the welding process).

Initially, during a start-up phase, the flux drop 162 releases flux 60 and a molten slag pool 56 is formed from the first strip 102, the work piece 50, and pulverized flux 60. Once the slag pool 56 is large enough for ESSC operations (i.e., once the "stick out" of the slag pool, which is illustrated as "S" in FIG. 2, is sufficient to extinguish an electrical arc used to initially create a molten slag pool), the apparatus 110 can begin cladding operations. That is, once the slag pool is large enough, the apparatus 110 can move in the welding direction D1 and/or the work piece 50 can be moved in direction opposite to D1 to initiate ESSC operations.

During the welding/cladding phase, current (shown as "I") is introduced to the first strip 102 and second strip 104 at the contact jaw 120. The leading strip 102 is then brought into contact with the slag layer 54 and the current flows through the first strip 102 strip and into the layer of electrically conductive slag 54. More specifically, a bottom end of the first strip 102 is brought into contact with the slag 54 and the current flows through the first strip 102 into a molten portion 56 of the slag layer 54. The resistance of the molten slag 56 generates heat that keeps the welding process going (i.e., the slag temperature remains at approximately 2,300° C., at least adjacent the strips). Consequently, as the ESSC operations proceed in the welding direction D1, the first strip 102 and work piece 50 are melted by the molten slag pool 56 and form a molten metal that is eventually deposited on the work piece 50 as a metal weld 52. The flux 60 also melts, at least in part, as the first strip 102 and work piece 50 are melted, creating the protective layer of slag 54 over the metal weld 52. However, at least a portion of the slag layer 54 that is extending over the weld is molten slag, as indicated at 56.

That is, molten slag 56 extends over a molten metal weld 52, so that the molten slag 56 includes a portion above the metal layer 52 and a molten slag pool at the leading edge of the metal weld 52. Eventually, the molten slag layer 56 above the metal weld 52 solidifies, as is shown at 57; however, in the depicted embodiment, the second strip 104 is quickly introduced to (i.e., incorporated or mixed into) the molten slag 56 before the molten slag 56 hardens (as indicated at 55). In fact, the trailing strip 104 actually rides on top of the slag layer 54 and since current is running through the second strip 104, the second strip 104 extends the length of the molten slag 56. For example, in the depicted embodiment, the molten slag 56 may begin to solidify approximately 50 mm-150 mm after the second strip, or even 100-200 mm after the second strip. Consequently, the resultant metal weld 52 may be formed from a combination of the material of the first strip 102 and the material of the second strip 104. More specifically, the resultant weld may include a small buffering layer formed from the first strip 102 and the remaining weld 52 may be formed from a desired mix or composition of the first strip 102 and the second strip 104. Throughout this process, a layer 62 of pulverized flux protects the leading edge of the molten slag pool 56.

As is described in further detail below, the cladding or welding phase continues until a stop phase is detected (i.e., a signal is received from a user interface). Once the stop phase is initiated, both the first strip 102 and the second strip 104 must be removed from the molten slag 56 to prevent one of the first strip 102 and the second strip 104 from being secured to solidified slag.

Figure 3:
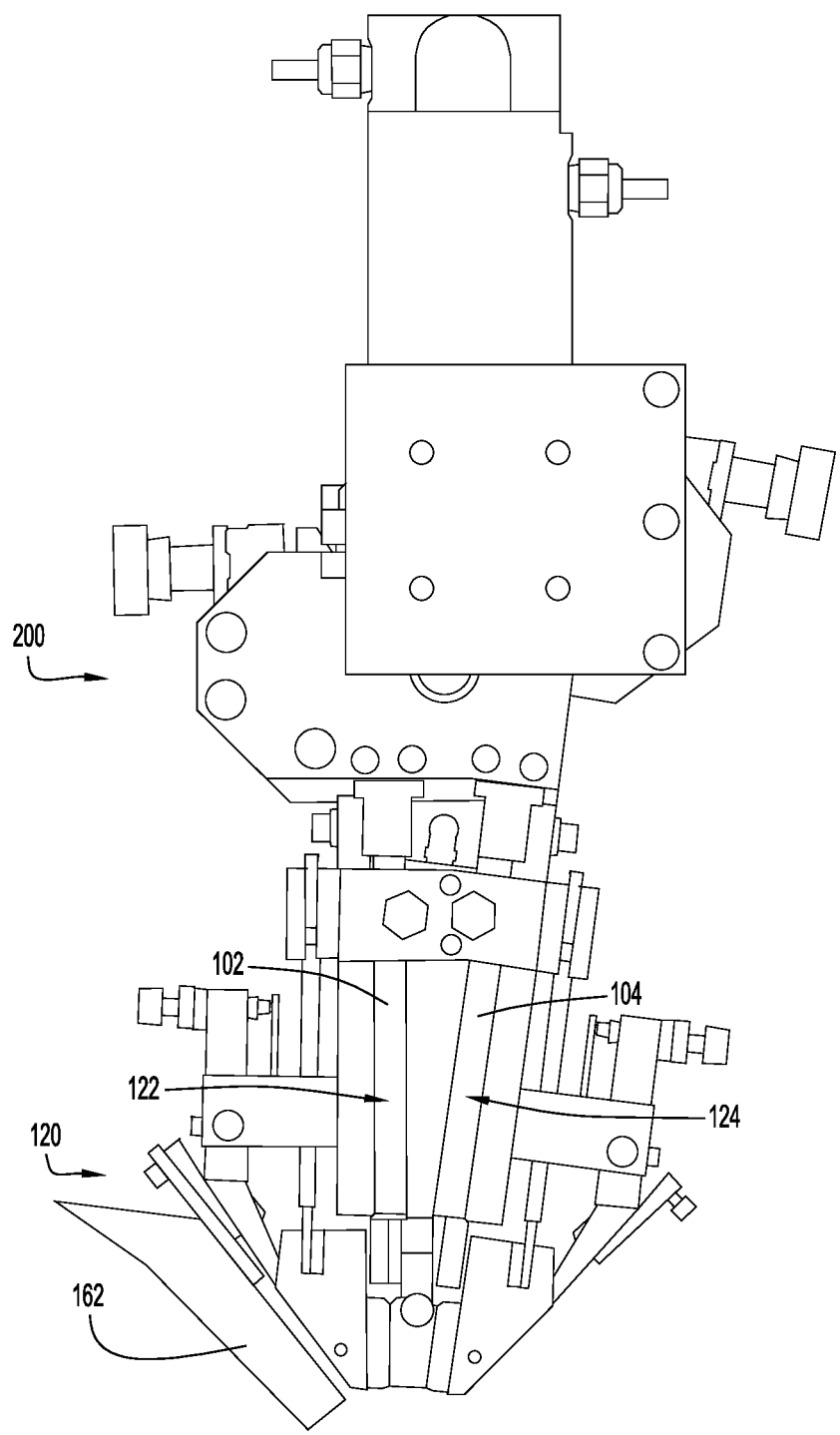
FIG. 3 is a left side view of an apparatus with which the techniques presented herein may be employed, according to an example embodiment.

Now turning to FIG. 3, for a description of an example twin ESSC apparatus 200 (i.e., a cladding head 200) with which the techniques described herein can be utilized. In FIGS. 1 and 2, the leading edge is illustrated on the right, whereas in FIG. 3 the leading edge is illustrated on the left (i.e., FIGS. 1 and 2 illustrate an apparatus from the right side and FIG. 3 illustrates the apparatus from the left side); however, the embodiments are otherwise largely the same. Consequently, apparatus 200 has been labeled with the at least some of the same reference numerals used in FIGS. 1 and 2 to illustrate how the features of apparatus 200 correspond to the features discussed above. For example, the apparatus 200 includes a contact jaw 120 configured to receive a leading strip 102 and a trailing strip 104.

More specifically, apparatus 200 includes a leading passage 122 configured to receive and guide the first strip 102 to a work piece and a trailing passage 124 configured to and guide the second strip 102 to the same work piece. The apparatus 200 also includes a flux hopper 162 configured to create a protective layer on the leading edge of the cladding head. In this particular embodiment, the leading passage 122 and the trailing passage 124 are each configured to receive strips of a maximum width of approximately 90 mm and a maximum thickness of approximately 0.5 mm; however in other embodiments, the cladding head 200 may receive strips of any size (i.e., strips with widths of approximately 30 mm, 60 mm, 90 mm, 120 mm, etc. and/or widths of 0.3 mm, 0.7 mm etc.) The contact jaw 120 is also configured to transfer a current from a power source to the entire surface area of strips 102 and 104 disposed within the leading passage 122 and trailing passage 124.

Figure 4:
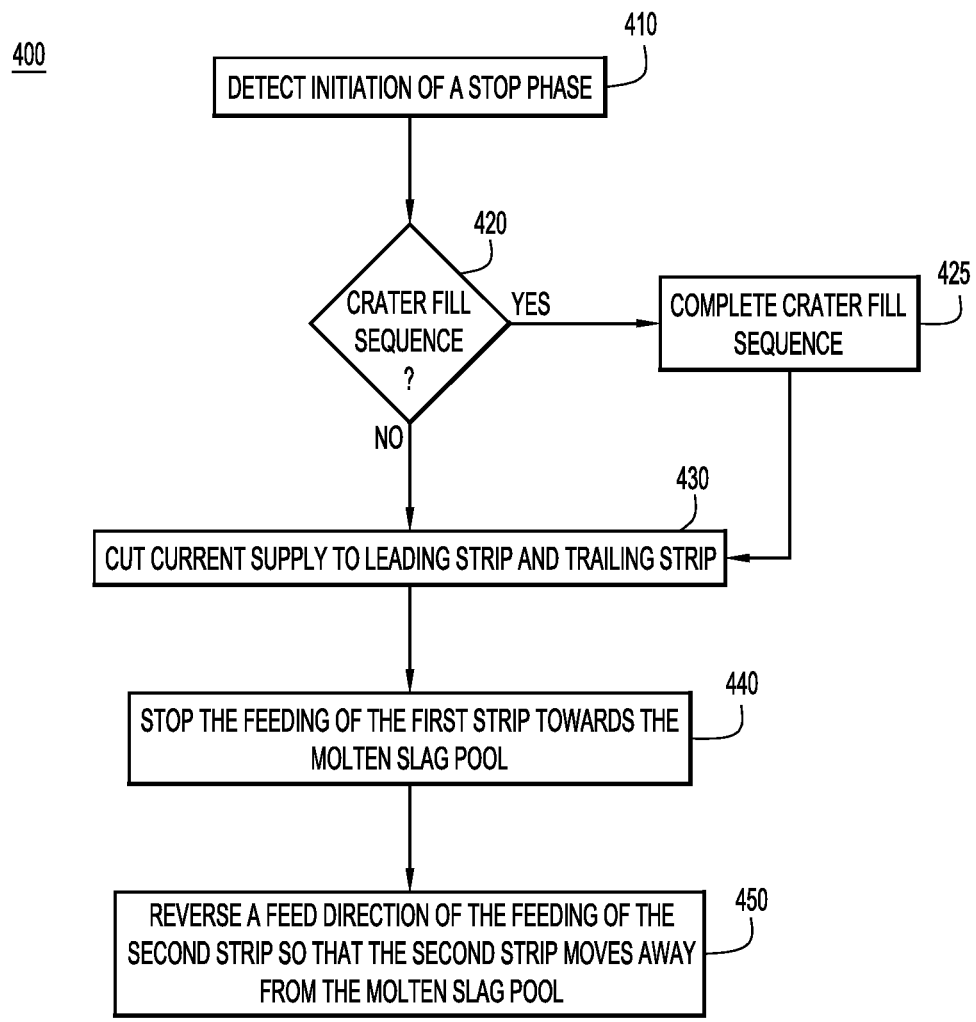
FIG. 4 is a high-level flowchart illustrating a method for stopping electroslag strip cladding operations utilizing multiple strips, according to an example embodiment.

Now turning to FIG. 4, a description is provided of a method 400 for stopping electroslag welding operations utilizing two or more feed strips. For clarity, the operations depicted in FIG. 4 are described as being performed by a cladding apparatus (i.e., apparatus 110 or 200); however, this is not intended to be limiting and, in other embodiments, these operations may performed, executed, or caused to execute by any entity, such as a controller (i.e., controller 170).

Initially, at 410, the cladding apparatus detects initiation of a stop phase. In most instances, cladding apparatus detects initiation of a stop phase when a user/operator pushes or otherwise actuates a stop button (i.e., a button, such as a touch screen button, that causes a signal to be sent to the controller 170). Additionally or alternatively, in at least some embodiments the apparatus may detect initiation of a stop phase by monitoring various welding parameters. That is, the apparatus may monitor one or more welding parameters and detect initiation of a stop phase based on the one or more monitored welding parameters.

As an example, the apparatus may detect initiation of a stop when the apparatus detects a welding parameter that is likely to be dangerous to the operator, the work piece, the weld quality, or the apparatus itself. Alternatively, the apparatus may detect initiation of a stop when the apparatus detects a welding parameter that indicates the welding or cladding phase has ended. As a specific example, the apparatus may monitor the current flowing to any strips that are being fed therethrough. If the cladding apparatus detects that current is no longer being supplied to the strips, the cladding apparatus may determine that the welding phase has ended and a stop phase has been initiated. As another example, if an apparatus is configured to automatically stop a welding phase if one of the strips (i.e., one of the trailing strips) has moved out of contact with the molten slag and is creating an open arc, the apparatus may detect initiation of a stop phase if the apparatus detects that one of the strips is no longer in contact with the molten slag.

More generally, a welding parameter may include or be characteristics of the cladding, such as the stick out of the molten slag pool, dilution of the cladding, penetration of the cladding, temperature of the molten slag pool, or other such characteristics. Any welding parameter may be measured based on any data or feedback provided to or gathered by the controller (i.e., provided to the controller by sensors) and the apparatus may detect initiation at 410 of a stop phase based on any welding parameter.

If a welding parameter is dynamic (i.e., changing or adjusting) during ESSC operations, the welding parameter may be referred to as an active welding parameter. Active welding parameters may respond to changes in welding conditions (e.g., changes in the distance between the end of the strip and the molten slag). Active welding parameters may also be related to and adjusted through adjustment of other active welding parameters. For example, adjustment of the feed speed of a leading strip may change the amount of current delivered through that strip. An active welding parameter as defined herein may also be referred to as a variable welding parameter, in contrast to welding parameters that are intended to be maintained at an essentially constant level. Moreover, active welding parameters are sometimes adjusted to maintain one or more non-active welding parameters at an approximately constant level. For example, active welding parameters may be adjusted manually or automatically in response to detected welding condition variations. However, an active welding parameter does not have to be measured at a corresponding strip. For example, a weld current can be measured at a power source connected to a strip.

As some examples, welding power and heat input may be active welding parameters. The welding power can be defined as P=U×I, where P (kJ) is welding power, U (V) is welding voltage and I (A) is welding current. Less energy in the welding process means that there is less excessive energy to heat the slag and melt the strips. More energy means that there is more excessive energy to heat the slag pool and melt the strips, and so the strip feed speed (i.e., the leading strip feed speed) may be automatically increased in response to a detected increase in welding power. Consequently, welding power may be an active welding parameter. The heat input can be defined as: $Q=k\times((U\times I)/v)\times 10^{-3}$, where Q (kJ/mm) is the heat input, k (dimensionless) is the thermal efficiency, U (V) is voltage, I (A) is current and v (mm/min) is the welding speed. Additionally, the welding speed may be an active welding parameter. The welding speed can be defined as the speed at which a welding head is moved across a work piece surface. If any of these example active welding parameters is outside of a predetermined range, the apparatus may end the welding phase and detect initiation of the stop phase at 410.

Still referring to FIG. 4, at 420, the apparatus determines whether a crater fill sequence is needed, insofar as "crater fill sequence" is used herein to describe further ESSC operations that level out the end of a cladding weld and is not is not used to describe operations that are exactly equivalent to crater fill operations performed for submerged arc welding. If, at 420, it is determined that a crater fill sequence is needed, the apparatus may complete the crater fill sequence at 425. That is, the apparatus may lower the amount of current directed to the leading strip and trailing strip while reducing the travel speed of the welding head (towards or to a stop) to shrink (and/or cool) the molten slag pool and complete or finish any ESSC operations without introducing an unwanted slope or angle to the end of the weld. Notably, during the crater fill sequence, the leading strip and any trailing strips are all introduced to the molten slag pool (however, the feed rate may be reduced, for example, over the course of the crater fill operations). This may ensure that the weld has the same composition over its entire length (i.e., if two strips of different material are being fed to the molten slag pool).

Generally, the crater fill sequence is one example of a sub-phase that may be included in the stop phase; however, in other embodiments, the stop phase may include a plurality of sub-phases or zero sub-phases (i.e., if, in the depicted embodiment, no crater fill sequence is needed).

As another example sub-phase, in some embodiments, the apparatus may stop supplying current to one or more trailing strips before cutting the supply of current to the leading strip. To effectuate this, the apparatus may switch the strips from a twin strip configuration to a tandem strip configuration and divert energy (i.e., current) intended for the one or more trailing strips to one or more load banks (i.e., two 800 amp load banks). This could finish the weld with only the leading strip and, thus, might save material from one or more trailing strip. However, this sub-phase would not be suitable when the trailing strip is a different material than the leading strip because the end of the weld would not have the proper composition. Moreover, this phase would need to be carefully controlled to ensure it does not degrade the weld quality at the end of the weld (i.e., welding parameters might to be adjusted to obtain a uniform weld quality as the welding shifts from a twin configuration to a single strip configuration). That being said, if the apparatus welds with a single strip, the trailing strip can be retracted during the single strip ESSC operations. That is, the operations described below with respect to step 450, as well as the operations described in connection with FIGS. 5 and 6, could occur during the single strip ESSC operations performed at 425.

After completing sub-phase sequences or determining that no sub-phase sequence are required, the apparatus may cut power to the leading strip and any trailing strips at 430. Subsequently or concurrently, at 440, the apparatus may stop feeding the first strip towards the molten slag pool. For example, the controller 170 may send a signal to feeder 130 that instructs feeder 130 to stop feeding strip 102 towards molten slag 54. The feed direction of any trailing strips is reversed at 450 so that that the trailing strips move away from the molten slag pool (i.e., the trailing strips are retracted). For example, the controller 170 may send a signal to feeder 140 that instructs feeder 140 to reverse the feed direction of strip 104. The reversing operations performed at 450 may also be performed subsequent to or concurrently with the power cutting operations performed at 430, as well as the feed stop operations performed at 440.

More specifically, at 450, the bottom end of each trailing strip included in the ESSC operations is moved upwardly, away from the workpiece, and out of the conductive slag 56. This movement may also be referred to as backward movement or retracting movement, because this movement is effectuated by running the feeder of a particular trailing strip backwards or in reverse as compared to its normal operating direction (which feeds the trailing strip towards the workpiece and conductive slag). Moreover, the upward or retracting movement may be referred to as a mechanical movement since the movement is driven (i.e., pushed and/or pulled) by mechanical components of a feeder.

Since the retracting mechanical movement moves the bottom end of a trailing strip out of the conductive slag, the bottom end of each retracted trailing strip may have already been exposed to the conductive slag. Consequently, an outermost edge of the bottom end of a retracted strip may be partially melted and/or deformed (insofar as the strip may not be the same as portions of the strip that have not been exposed to the molten slag). Additionally, melted flux may be attached to the bottom end of a trailing strip (or to any portion of the strip disposed below the contact jaw 120). In order to prevent deformations or attached flux from damaging the feeders or any other parts of the apparatus, the apparatus may monitor various safety parameters during the retraction performed at 450. That is, at 450, the apparatus may only retract trailing strips when the trailing strips are not in contact with an obstacle, such as the portions of apparatus 200 defining passages 122 and 124. One example safety parameter—retraction resistance—is discussed in further detail below. Additionally or alternatively, the apparatus may include mechanical features to ensure that a deformation or attached flux does not damage the apparatus or portions thereof, such as a feeders with limited rotational speed, as is also described in further detail below.

As mentioned, in some embodiments, operations 430, 440, and 450 may be performed simultaneously or shortly after one another, such that any trailing strips are immediately removed from the molten slag upon detection of a stop phase or upon completion of one or more sub-phases (i.e., immediately after completion of a crater fill sub-phase). Moreover, at 430, 440, and 450, the welding head may be stopped (i.e., no longer moving in the welding direction D1) or moving. If the welding head is still moving in the welding direction, the leading strip can be removed from the molten slag pool at 440 due to the natural movement of the welding head. However, moving the welding head in the welding direction will not immediately remove any trailing strips from the molten slag (it may also cause the end of the weld to have a sloped or angled end portion). Consequently, to prevent the trailing strips from becoming stuck in solidifying slag, the feed direction of the trailing strips is reversed regardless of whether the welding head is stopped or moving. That is, the trailing strips are fed in reverse at 450, regardless of whether the welding head is stopped or moving.

Moreover, at 430, 440, and 450 the leading strip and the cladding head need not be retracted or moved away from the workpiece. That is, the leading strip and the cladding head may be maintained at a distance from the workpiece during the retraction of the trailing strip. For example, during the cladding phase, the cladding head may be maintained at a distance from the workpiece and the cladding head may be maintained at the same distance (an "operational distance") during retraction of the trailing strip. Meanwhile, the leading strip is maintained in a position that does not allow the leading strip to contact the slag pool (but is also not retracted).

Figure 5:
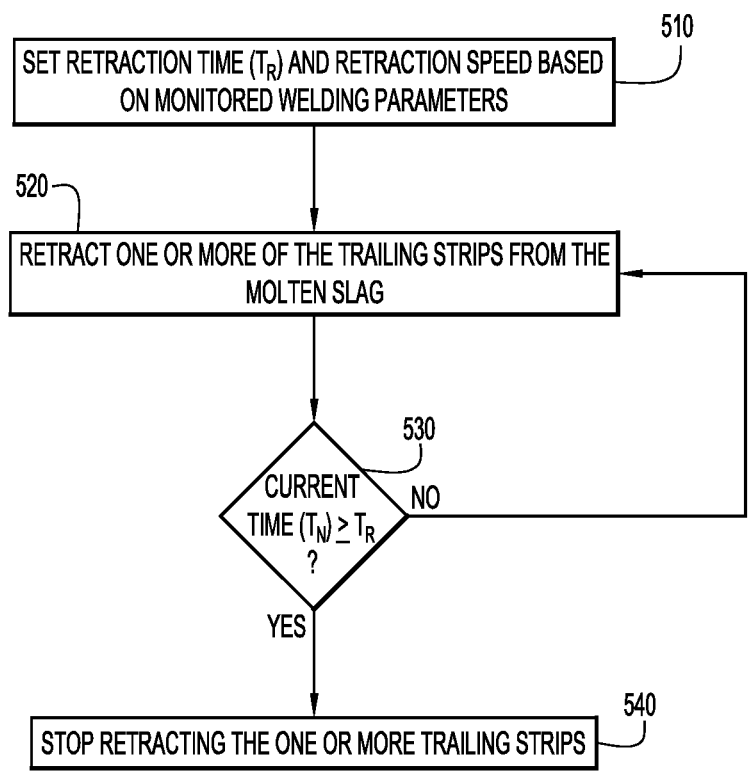
FIGS. 5 and 6 are flowcharts illustrating methods of controlling strip retraction while stopping electroslag strip cladding operations utilizing multiple strips, according to example embodiments.
Figure 6:
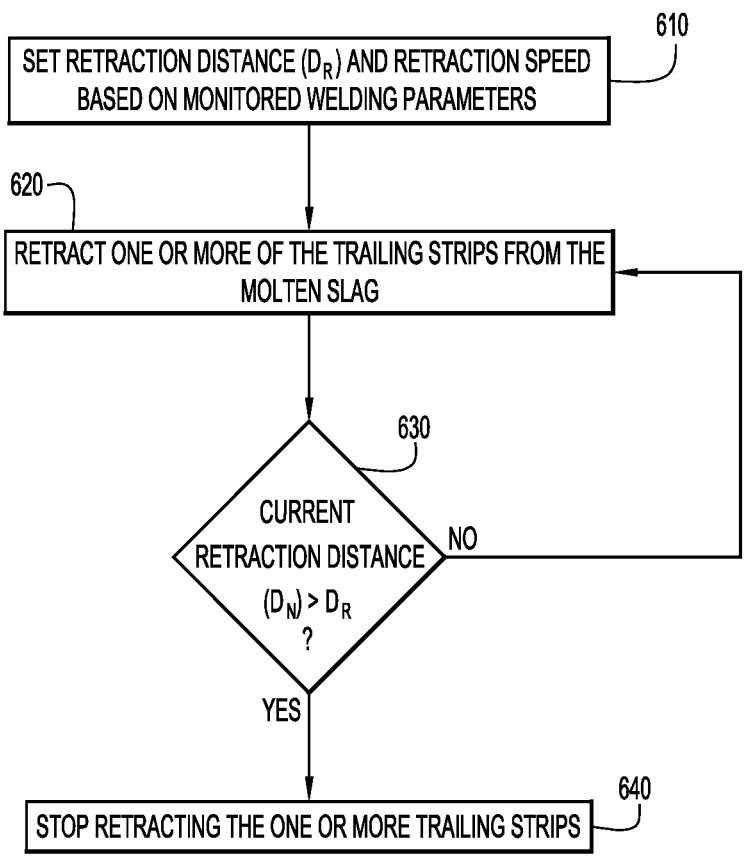

Now turning to FIGS. 5 and 6, but with continued reference to FIGS. 1-4, in different uses and/or embodiments, the trailing strips can be reversed (i.e., at 450) in different manners. In FIG. 5, any trailing strips are reversed for a set period of time; however, the period of time may vary from embodiment to embodiment or even from use to use of a particular embodiment. By comparison, in FIG. 6, any trailing strips are reversed for a set distance that may also vary from embodiment to embodiment or even from use to use of a particular embodiment. In either embodiment, the trailing strips are retracted enough to ensure that that trailing strips are removed from the molten slag. That is, the bottom end of the trailing strips are moved above the stick out of the molten slag (i.e., in FIG. 2, the bottom end of strip 104 is moved above slag layer 54).

More specifically, in either embodiment, the bottom end of a trailing strip is moved a retraction distance. The retraction distance moves the strip above a retraction minimum that ensures the trailing strip is moved out of the slag layer with some margin of safety, but the retraction distance is also shorter than a maximum retraction distance that may be defined by the length of the portion of the strip that is extending from the apparatus. That is, the retraction distance is preferably shorter than the length of the portion of the strip that is extending from the apparatus (i.e., the length between the contact jaw 120 and the bottom end of the strip in FIG. 2). Since the bottom end of the strip may be partially melted or deformed (i.e., a bottom edge may not be straight and may be angled or irregular), the maximum is, in at least some embodiments, also determined with a margin of error/safety. This may be another safety feature that prevents the bottom of the strip from retracting into the apparatus 200. Meanwhile, the minimum retraction distance may be a set distance (i.e., approximately 5-15 mm) and may be determined based on welding parameters measured in the welding phase prior to the stop phase. As mentioned, the minimum retraction distance may decrease the likelihood of a trailing strips being retracted while engaged with an obstacle.

To determine the minimum and maximum retraction distance, the apparatus may determine the length of the trailing strip extending beyond the contact jaw and the stick out distance of the molten slag. This information may be determined based on a combination of known parameters (i.e., a known position of the welding head) and welding parameters measured or monitored during the welding phase and/or the stop phase. As one example, the length of the trailing strip extending beyond the contact jaw (also referred to as an exposed length) may be measured by an optical sensor while the stick out distance of the molten slag may be determined based on a combination of welding parameters. Additionally or alternatively, a mechanical element that can move into contact with the work piece to determine the distance between the welding head and the work piece and/or the molten slag may be included on the apparatus.

Now turning specifically to FIG. 5, at 510, the apparatus sets a retraction time ($T_R$) and a retraction speed for any trailing strips. In some embodiments, the retraction speed is based on the retraction time and the retraction time is based on one more monitored welding parameters, but in other embodiments, the retraction time may be based on the retraction speed and the retraction speed may be based on one more monitored welding parameters. Either way, collectively, the retraction speed and retraction time are set based on one or more welding parameters, such as the stick out, welding head speed, etc., to ensure that the trailing strips are retracted a retraction distance between the minimum retraction distance and the maximum retraction distance. That is, the trailing strips are retracted a distance that removes the trailing strips from the molten slag to prevent the trailing strips from being secured or adhered to solidifying slag without retracting too far into the apparatus.

In at least some embodiments, the retraction speed is a constant speed in a range of approximately 50 cm/min to 150 cm/min, such as approximately 100 cm/min. Lower retraction speeds, such as 50 cm/min may be suitable because the molten slag pool does not harden immediately, but in some instances faster speeds may minimize the chances of a retracted strip including irregularities. That being said, faster retraction speeds require more precise control, especially when the retraction is controlled based on time (i.e., as in FIG. 5). Regardless of the particular speed, when a constant retraction speed is utilized, the constant speed may initially be a target speed and the trailing strip may be brought up to the constant speed as quickly as possible. Then, the trailing strip may be maintained at the constant speed for the remainder of the retraction period. At the end of the retraction period, the retraction speed is brought to zero as quickly as possible. Alternatively, the retraction speed may vary over time. For example, the feed speed of any trailing strips may be slowly decreased before being gradually reversed to a target reverse speed (i.e., the speed may follow a parabolic or parabolic-like curve). In some instances, this gradual reversal may protect the motor of an associated feeder; however, in other instances, a gradual reversal may not be necessary since the motor does not operate at high speeds and can be easily reversed from its low operating speeds without risk of malfunction or damage.

At 520 and 530, the trailing strips are retracted (at the retraction speed or speeds) from the molten slag until the trailing strips have been retracted for the set retraction time. Once, the trailing strips have been retracted for the retraction time (i.e., once the current time ($T_N$)>$T_R$) the retraction stops, at 540. As mentioned, the length of the retraction time can be determined by the controller based on one or more entered, measured or predetermined parameter values. Examples of relevant parameter values are the leading strip feed speed prior to the stop, retraction speed (or speed profile if the retraction speed is varied), the stick out, etc. However, notably, when the trailing strips are retracted based on time, the apparatus does not need to monitor any parameters of the retraction. Instead, the feeders simply run in reverse (i.e., in accordance with any retraction speed function) for a certain period of time. Consequently, this embodiment may be suitable for apparatuses that include feeders (i.e., feeder 130 and feeder 140) without encoders. That being said, the retraction time may also be set with a safety margin to prevent any damage or unwanted consequences during the retraction.

By comparison, in FIG. 6, the apparatus retracts the trailing strips based on a distance of retraction. Consequently, the apparatus or the feeders includes sensors configured to measure movement of the trailing strips (i.e., a pulse sensor may count rotations of a strip coil or rotations of a feeder motor). More specifically, at 610, the apparatus sets a retraction distance ($D_R$) and a retraction speed for any trailing strips. In at least some of these embodiments, the retraction speed is based on the retraction distance which, in turn, may be based on one more monitored welding parameters (i.e., a stick out determined based on various underlying welding parameters). Alternatively, the retraction distance may be set based on user input (i.e. be predetermined) and the speed may be determined based on the user input and monitored welding parameters. Either way, the retraction speed may be constant or varied in the same manner described above in connection with FIG. 5, provided that the retraction speed and retraction distance ensure that the trailing strips are removed from the molten slag a retraction distance between a maximum and minimum retraction distance (i.e., to safely prevents the trailing strips from being secured or adhered to solidifying slag).

At 620 and 630, the trailing strips are retracted (at the retraction speed or speeds) from the molten slag until the trailing strips have been retracted to a retraction distance that is greater than or equal to the set retraction distance ($D_R$). Once, the trailing strips have been retracted for the retraction time (i.e., once the current retraction distance ($D_N$)>$D_R$) the retraction stops, at 640. In order to measure the current retraction distance $D_N$ at 630, the apparatus may include any number of sensors, such as an optical sensors, that can track the upward movement of the trailing strips. As one specific example, a sensor may count rotations of an output shaft of a feeder's motor as the motor drives the feeder to retract the trailing strip away from the work piece. The sensor may send the counted rotations to the controller which may determine the distance the trailing strip has been retracted based on the count. That is, the controller may determine a current retraction distance ($D_N$) based on a counted number of rotations. As another example, the current retraction distance can be determined with a measuring device acting directly on the trailing strip.

Now referring generally to FIGS. 5 and 6, in some embodiments, during the feedback loops (i.e., the loop between 520 and 530, as well as the loop between 620 and 630), the apparatus may measure retraction resistance. The retraction resistance can be measured in many different ways. For example, the current delivered to the feeder for the trailing strip can be monitored. A motor current amperage increase is indicative of a retraction resistance increase which, in turn, may indicate that an enlarged or deformed portion of the trailing strip has come into contact with an obstacle. The motor current can be measured by means of any suitable current measuring device.

If the retraction resistance is within a normal operating range (i.e., above a lower threshold and below an upper threshold), the retraction may continue based on time or distance. However, if the retraction resistance is outside the normal operating range, the strip may have encountered an obstacle, been retracted too far (i.e., the bottom end may be in the apparatus), or the trailing strip may be on the verge of being retracted too far (i.e., the tip of the strip may be entering the contact jaw). Consequently, if the retraction resistance is outside the normal operating range, the retraction operations (based on time or distance) may be stopped or paused. It is also possible to briefly reverse the trailing strip feeder following a detected retraction resistance increase so that the trailing strip is, very briefly, fed back towards the workpiece.

Additionally or alternatively, the retraction resistance may be incorporated as a safety measure by limiting the strength of the feeders. For example, the current flow to feeder motors can be limited so that the feeders are not capable of moving a deformed or irregular portion of a trailing strip (i.e., a portion including adhered flux) past an obstacle during retraction.

Moreover, in some embodiments, the apparatus may constantly or continuously measure any parameters during the feedback loops (i.e., the loop between 520 and 530, as well as the loop between 620 and 630), including retraction distance and retraction resistance. To enable this, sensors embedded in or included in the ESSC apparatus may continuously monitor any desirable welding parameters at predetermined intervals, such as intervals of approximately 250 microseconds or any intervals in the range of 1 microsecond to 10 milliseconds. For example, sensors may measure retraction resistance of the trailing strip every millisecond and send or transmit the monitored values to the controller. In at least some embodiments, the controller filters received values to analyze a particular parameter.

Advantageously, regardless of how a trailing strip is retracted, once the trailing strip is retracted, the welding apparatus may be free to move with respect to the workpiece. For example, the welding apparatus may be repositioned along the welding direction D1, moved along a boom, and/or moved vertically with respect to the workpiece. Moreover, no grinding, cutting, finishing or further welding operations will be required after the stopping phase because a high quality weld will be deposited and neither strip will be adhered thereto. The various sub-phases of the stopping phase ensure may also ensure that the weld is not sloped or uneven. Meanwhile, the safety margins in the retraction distance, retraction time, etc. will prevent the trailing strip from touching the molten slag, even when stick out variations or other work piece surface irregularities are present at the end of the a weld. Since the second strip of a twin strip ESSC operation is often a more expensive material, these techniques may save costs associated with cutting or repairing the second strip and, moreover, these techniques may save costs associated with re-cladding areas damaged by a trailing strip stuck in the molten slag.

Figure 7:
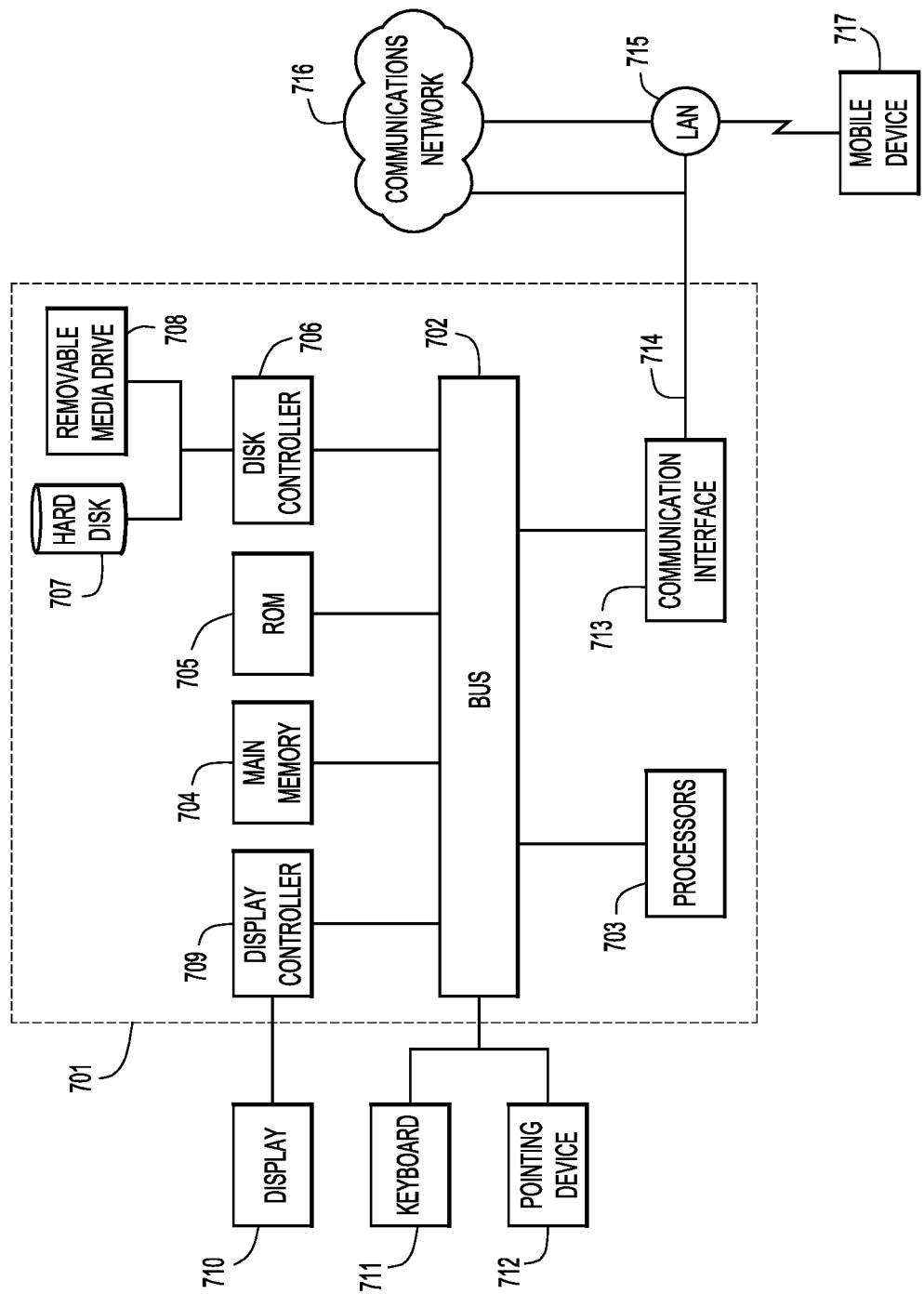
FIG. 7 is a block diagram depicting a computer system upon which the techniques presented herein may be implemented, according to an example embodiment.

Now referring to FIG. 7 for a description of a computer system 701 upon which the techniques presented herein may be implemented. The computer system 701 may be representative of the controller 170 illustrated in FIG. 1.

The computer system 701 includes a bus 702 or other communication mechanism for communicating information, and a processor 703 coupled with the bus 702 for processing the information. While the figure shows a single block 703 for a processor, it should be understood that the processors 703 represent a plurality of processing cores, each of which can perform separate processing. The computer system 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing stop phase logic 174 (see FIG. 1), or at least a portion thereof, temporary variables or other intermediate information during the execution of instructions by the processor 703.

The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703. For example, ROM 705 may be used for storing stop phase logic 174 (see FIG. 1), or at least a portion thereof. Memory 704 and/or ROM 705 may be representative of memory 172 from FIG. 1.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, tape drive, and removable magneto-optical drive, optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as liquid crystal display (LCD), or a light emitting diode (LED) display, for displaying information to a computer user. The computer system 701 includes input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. The pointing device 712 may also be incorporated into the display device as, for example, a capacitive touchscreen and/or a resistive touchscreen.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the invention, and for enabling the computer system 701 to interact with a human user (e.g., a network engineer). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local area network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA) laptop computer, or cellular telephone.

To summarize, in one form, a method is provided comprising: detecting, during a welding phase of an electroslag welding operation feeding a first strip and a second strip towards a molten slag pool formed on a work piece, initiation of a stop phase; stopping the feeding of the first strip towards the molten slag pool; and reversing a feed direction of the feeding of the second strip to retract the second strip away from the molten slag pool.

In another form, an apparatus is provided comprising: a first strip feeder to guide a first strip towards a work piece; a second strip feeder to guide a second strip towards the work piece; a power source to transfer a current to at least one of the first strip and the second strip to create a molten slag pool on the work piece sufficient for initiation of a cladding phase; and a controller to: detect, during the cladding phase, initiation of a stop phase; stop the first strip feeder from feeding of the first strip towards the molten slag pool; and cause the second strip feeder to reverse a feed direction of the second strip to retract the second strip away from the molten slag pool.

In yet another form, one or more non-transitory computer-readable storage media is provided encoded with software comprising computer executable instructions and when the software is executed operable to: detect, during a welding phase of an electroslag welding operation feeding a first strip and a second strip towards a molten slag pool formed on a work piece, initiation of a stop phase; cause a first feeder to stop feeding the first strip towards the molten slag pool; and cause a second strip feeder to reverse a feed direction of the second strip to retract the second strip away from the molten slag pool.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

We claim:

1. A method for stopping electroslag welding, comprising:
    feeding a first strip and a second strip, each of which has a thickness and a width that is larger than the thickness, towards a molten slag pool formed on a work piece, wherein the first strip and the second strip are fed during a welding phase of an electroslag welding operation;
    supplying current to the first strip and the second strip;
    receiving a signal indicative of termination of the electroslag welding operation; and
    in response to the received signal:
        cutting the current to the first strip and the second strip;
        stopping the feeding of the first strip towards the molten slag pool after cutting the current; and
        reversing a feed direction of the feeding of the second strip to retract the second strip away from the molten slag pool after cutting the current.

2. The method for stopping electroslag welding of claim 1, wherein the reversing further comprises:
    reversing a motor direction of a feeder feeding the second strip so that the second strip is mechanically retracted.

3. The method for stopping electroslag welding of claim 1, wherein the reversing further comprises:
    reversing the feed direction at a predetermined retraction speed for a retraction time, the retraction time is based on one or more welding parameters.

4. The method for stopping electroslag welding of claim 3, wherein the retraction time is determined to provide a retraction distance between a maximum retraction distance and a minimum retraction distance, wherein the maximum retraction distance is less than a length of the second strip extending from a feeder.

5. The method for stopping electroslag welding of claim 1, wherein the reversing further comprises:
    reversing the feed direction at a predetermined retraction speed for a retraction distance between a maximum retraction distance and a minimum retraction distance, wherein the minimum retraction distance is a distance sufficient to retract a distal portion of the second strip from a slag layer.

6. The method for stopping electroslag welding of claim 5, wherein the retraction speed is a fixed speed based on one or more welding parameters.

\* \* \* \* \*